United States Patent Office 3,508,056
Patented Apr. 21, 1970

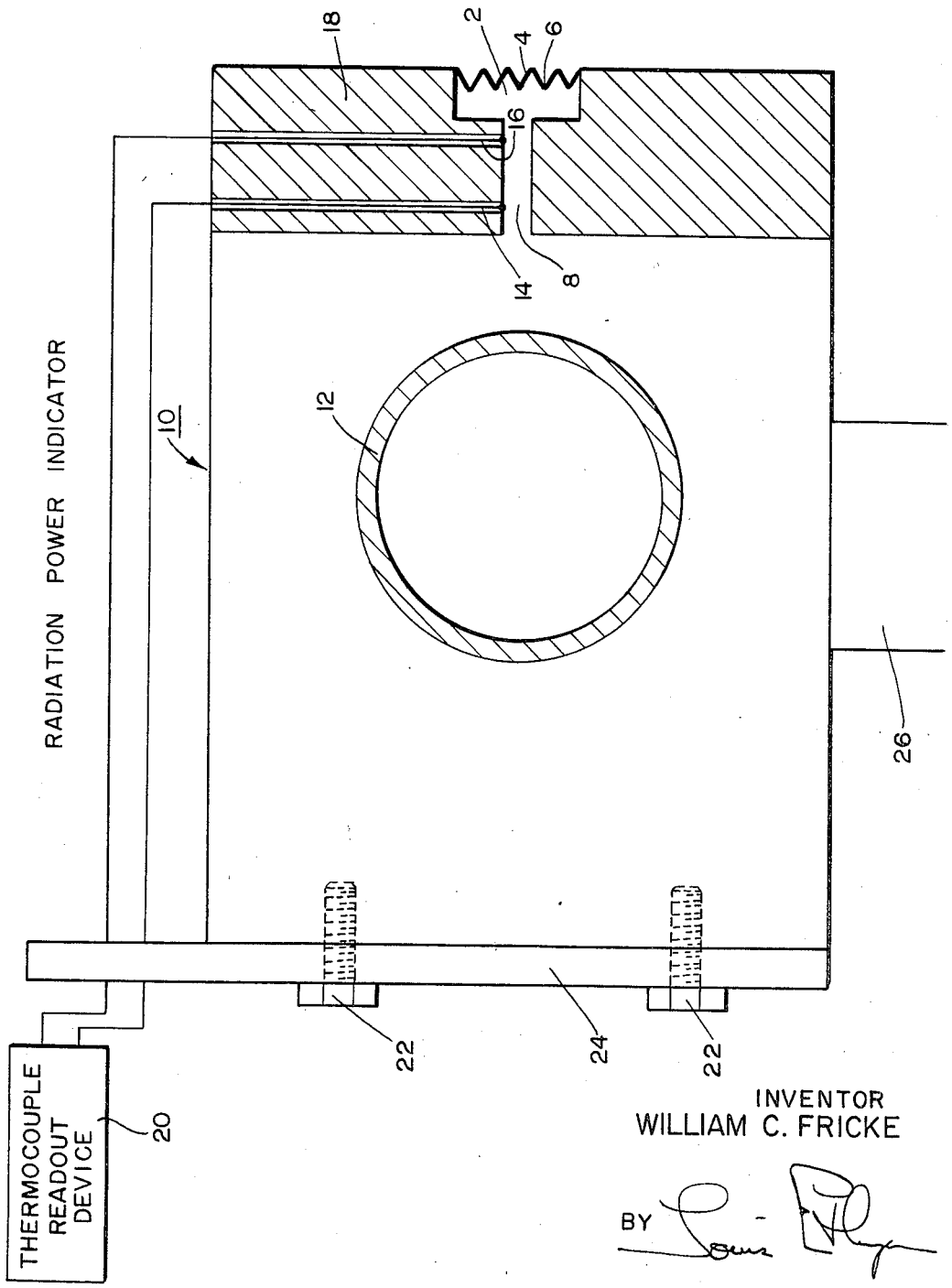

3,508,056
RADIATION POWER INDICATOR
William C. Fricke, Reeds Ferry, N.H., assignor to Sanders Associates, Inc., Nashua, N.H., a corporation of Delaware
Filed June 15, 1967, Ser. No. 646,357
Int. Cl. G01k *17/16*
U.S. Cl. 250—83.3
19 Claims

ABSTRACT OF THE DISCLOSURE

A radiation power indicator useful for measuring the power in high power laser beams includes an energy absorbing detector and a heat sink for rapidly conducting thermal energy away from the detector. The incident beam power is measured as a function of the thermal gradient across a thermal conductor between the detector and the heat sink.

BACKGROUND

Field of the invention

The present invention relates to a device for directly measuring the power in a beam of radiant energy. More particularly, the invention is concerned with the measurement of the power of high power laser beams.

Prior art

In the past, the power of laser beams has been measured by devices, such as thermopiles, capable of absorbing radiant energy. A typical thermopile consists of a sheet of metal having a blackened surface exposed to the impinging radiant energy. Affixed to the metal on the side opposite the blackened surface are a number of thermocouples electrically connected in series. As the metal heats up from absorption of the radiant energy, the thermocouples provide a voltage output proportional to the temperature rise caused by the energy absorption. Because of its limited ability to radiate away large quantities of heat, the thermopile experiences a very rapid temperature rise. This phenomenon is somewhat analogous to the temperature rise which is occasioned by using a magnifying glass to focus sunlight upon a small piece of metal.

To avoid destruction of the thermopile due to the rapid temperature rise, it has been the practice to attenuate the inpinging beam. An attenuator for this purpose consists of a mirror sufficiently silvered to reflect about 99.9% of the impinging light. The 1/10 of 1% that is transmitted to the thermopile does not cause a destructively high temperature rise.

The principal problem with such prior art radiation power measuring devices is their inherent inaccuracy. For example, a typical attenuator, which reflects 99.9% of the impinging radiation, has an accuracy of about plus or minus 0.1% in its reflectivity. If 0.1% of the impinging radiation is being admitted and the attenuator has an accuracy of plus or minus 0.1% then, the error at any given instant may be as high as 100%. This degree of inaccuracy has been unavoidable since the concentration of power in a typical laser beam is so great that it damages or destroys the detectors used in conventional radiation power indicators unless the beam is attenuated to a fraction of a per cent of its actual power.

Where a determination of the instantaneous power level of a laser beam is not required, the average power of a laser beam during a measured time interval can be determined by the temperature rise in a known volume of water. If a beam of unknown power is incident on a volume of water and is totally absorbed, then the energy of the beam causes the temperature of the water to rise according to the relation between energy absorbed, E, the specific heat of water, C, and the temperature rise in the water, ΔT, in accordance with the expression $$\Delta T = \frac{E}{C}$$

One problem stemming from the use of a calorimeter of this type is that the time constant of such a device will be long, at least several seconds. Unless a special absorbing device is used to absorb the incident radiation, this calorimeter will be very wavelength sensitive. Water is almost totally transparent to light in the visible region and becomes more and more opaque at longer wavelengths.

Some experiments using calorimeters to measure the power of incident laser beams have proved very unsatisfactory. The precision of the measurement is poor, mainly because of evaporation due to boiling, and because the time required to make the measurement is excessive—on the order of several minutes.

OBJECTS

It is, therefore, an object of the present invention to provide a reliable, accurate means for directly measuring the power of beams of radiant energy up to high power levels.

Other objects of the invention will in part be obvious and will in part appear hereinafter.

The invention accordingly comprises an article of manufacture possessing the features, properties, and the relation of elements which will be exemplified in the article hereinafter described, and the scope of the invention will be indicated in the claims.

SUMMARY OF THE INVENTION

Briefly, the applicant has discovered that a highly accurate and effective way to measure the power of high power beams of radiant energy is to use a detector capable of absorbing substantially all of the energy in an unattenuated laser beam and to conduct the resulting heat away from the detector very rapidly. Thus the large errors introduced by attenuators placed in the beam of radiant energy are avoided. This is done with a metal detector having a blackened surface upon which the beam impinges. Closely spaced grooves may be formed in the surface of the detector so that any energy unabsorbed upon first contact with the detector is reflected deeper into the grooves where it may then be absorbed. The heat generated in the detector by the impinging radiant energy is rapidly conducted into a heat sink by means of an intervening thermal conductor.

The power of the impinging beam is determined by measuring the temperature drop along the thermal conductor, since this drop is a function of the heat flowing to the heat sink.

The present invention, therefore, avoids the difficulty of prior art devices by absorbing substantially all the impinging energy, thereby improving accuracy, while conducting heat away so rapidly that life and reliability of the device are significantly enhanced.

BRIEF DESCRIPTION OF THE DRAWING

For a fuller understanding of the nature and objects of the invention, reference should be had to the following detailed description taken in connection with the accompanying drawing which illustrates, partly in cross section, an elevation of one embodiment of the present invention.

DESCRIPTION OF THE PREFERRED EMBODIMENT

As show in the drawing, a detector 2 serves as a means for absorbing impinging radiant energy such as a laser beam. The surface 4 of the detector 2 is blackened to maximize its absorption of the impinging radiant energy. In addition, grooves 6 are provided in the detector 2 to improve further the absorption of the impinging energy by reflecting unabsorbed photons such that they are likely to be absorbed by subsequent contact with the blackened surface 4.

Extending from the detector 2 is a thermal conductor in the form of a rod 8. The purpose of the rod 8 is to conduct heat from the detector 2 into a heat sink 10. Passing through the heat sink 10 is a cooling conduit or pipe 12 which may be used to circulate a coolant through the heat sink 10 to maintain it at a relatively constant temperature.

A pair of thermocouples 14 and 16 are affixed to and spaced apart along the rod 8. The leads from the thermocouples 14 and 16 extend out through the thermal insulation 18 to a thermocuple readout device 20.

A panel 24, on which the readout device 20 is mounted, is secured by means of bolts 22 onto the heat sink 10. The heat sink also carries a mounting rod 26 which may be used to support the radiation power indicator on a movable track or on some fixed base.

Applicant's radiation power indicator makes use of the fact that (1) substantially all the energy impinging on the detector 2 is converted into heat that flows through the rod 8 to the heat sink 10 and (2) the heat flow is proportional to the temperature drop along the rod. More specifically, the temperature drop $\Delta T$ between two points along the rod 8 is related to the heat flow W by $$W = -\frac{kA}{L} \Delta T \qquad (1)$$

where $k$ is the thermal conductivity of the rod 8, A is the cross-sectional area of the rod and L is the distance between the two points. Thus the power P of the incident beam is related to the temperature drop by $$P = m\Delta T \qquad (2)$$

where $m$ is a constant.

The quantity $\Delta T$ is measured by the thermocouples 14 and 16 and thus the output of the readout device 20 indicates the power in the monitored laser beam.

By flowing water or some other suitable coolant through the pipe 12, the temperature of the heat sink, 10, remains relatively constant. The output of the device is then effectively independent of the temperature of the heat sink.

The thermocouples 14 and 16 are connected in series with each other such that their output voltages are in opposition to one another. Consequently, the voltage measured at their terminals is a measure of the difference, $\Delta T$, in their temperatures. In this arrangement, the thermocouple 14, which is essentially at the constant temperature of the heat sink, effectively serves as a reference, thus obviating the common use of a bridge arangement with a separate pair of thermocouples maintained at known temperatures to provide reference voltages for the outputs of thermocouples 14 and 16.

An important feature of the instrument is its rapid response to changes in input power. Its time constant $\tau$ is given approximately by $$\tau = \frac{\rho C}{k} \left[ \frac{L_r}{A_r} V_f + V_r \right]$$

$$\tau = \frac{\rho C}{k} \left[ \frac{L_r V_f}{A_r} + L_r^2 \right] \qquad (3)$$

where $\rho$ is the density of the rod and detector material, C the specific heat of the material, $k$ the thermal conductivity of the material, $L_r$ the length of the rod 8, $A_r$ the cross-sectional area of the rod, $V_f$ the volume of the detector 2 and $V_r$ the volume of the rod.

The quantity $\rho C/k$ therefore is a property of the material used for the detector 2 and rod 8. The following table lists the value of $\rho C/k$ for several materials:

Aluminium _____ 1.26
Silver _____ 0.58
Gold _____ 1.54
Copper _____ 0.87
Lead _____ 4.15

Assuming that one desires a short time constant, corresponding to rapid response, it is clear that, except for cost, silver is the best material. While all the metals in the above table are quite suitable copper is a close second and is considerably less costly than silver. Another feature of copper is the fact that, when it is used for the rod 8, the thermocouple leads 14 and 16, which are, for example constantan, may be welded directly to the rod to form a copper-constantan thermocouple. Such a thermocouple performs well at typical operating temperatures of the device.

When used for the detector 2 copper also has several outstanding features. Among these is the fact that the surface 4 may be blackened by oxidation of the copper to black cupric oxide. Also, with copper the quantity $\rho C/k$ varies by a fairly small amount over the temperature range of the instrument, e.g. 0–200° C., thereby keeping nonlinearity of output at a low level.

The quantity $$\left( \frac{L_r V_f}{A_r} + \frac{L_r^2}{2} \right)$$

in Equation 3 is a function only of the dimensions of the detector 2 and rod 8. For example with a copper detector and rod a time constant of less than 0.1 second can be obtained with the following dimensions:

$L_r$—0.2 cm.
$A_r$—0.071 cm.$^2$
$V_f$—0.029 cm.$^3$

One can reduce the time constant most readily by reducing $L_r$. This also reduces the temperature drop between the thermocouples and thus reduces the sensitivity or resolution of the instrument, but even so a relatively short time constant can be obtained without undue degradation of resolution.

Moreover, reduction of $A_r$ will offset the effect of the decrease of $L_r$ on resolution; and at the same time it will not correspondingly increase the time constant, particularly if $V_f$ is not too large. Thus, a decrease of both $L_r$ and $A_r$ by the same percentage can decrease time constant without decreasing resolution.

The foregoing analysis assumes no decrease in $A_f$, the surface area of the detector exposed to the laser beam, since the total power of the beam can be measured only if it is all absorbed and beam diameters may be large. This is the reason for the enlarged surface area $A_f$ of the detector 2 relative to the cross-sectional area $A_r$ of the rod 8, i.e. to provide a relatively short time constant with a relatively high resolution. For example, if the rod 8 diameter is 0.16 cm., the detector 2 diameter is, for example, 1.0 cm. A numerical example of such a detector follows:

rod diameter=0.16 cm.

detector diameter=1.0 cm.

distance between thermocouple=0.2 cm.

sensitivity $= \frac{°C}{watt} = \frac{T}{W} = \frac{L}{kA_r} = 2.5°C/watt$ where $k$ is the conductivity of copper, of which the detector of the example is made. Therefore a temperature difference of 2.5° C. corresponds to a power flow of one watt. If ten watts of power are flowing, the temperature difference will be 25° C.

The heat sink 10 largely eliminates one source of error. A thermocouple has a somewhat non-linear response to temperature changes and therefore if the reference thermocouple 14 were to undergo large temperature excursions as a result of changes in input power, as permitted in prior instruments, the system would require fairly complex compensation or calibration procedures to avoid excess inaccuracy. This is avoided by the relatively constant temperature of the thermocouple 14 afforded by the heat sink. The heat sink, together with the high thermal conductivity of copper also markedly decreases the likelihood of damage from overheating by the laser beam. In fact, this device has been operated with no coolant flowing at all with no perceptible change in the operation of the device, except that it got quite hot. However, the temperature did not rise to the point where non-linearity made a perceptible change in the output.

The heat sink need not be maintained at a constant temperature; a variation of several degrees C will not unduly affect the accuracy of the instrument. However, the changes should occur more slowly than the time constant $\tau$ so that they are reflected at both thermocouples and thus do not significantly affect the net output of the thermocouples. In other words $1/\tau$ should be substantially greater than the rate of temperature change of the heat sink 10.

Over a temperature range of 0-25° C. for the thermocouple bridge 14 and 16, the non-linearity is less than 5%. A temperature range this small is easily obtainable with the construction described above.

Errors introduced by the geometry, that is, actual physical size and shape of the detector, location of the thermocouples and changes in geometry with temperature are negligible. Uncertainties in machining of the parts can be absorbed in the proportionality factor between the heat flow W and the temperature drop $\Delta T$.

Thermal expansion is also a negligible factor. For example, the thermal expansion of copper is about 0.0015%/° C.

The heat lost by conduction radially outward through the insulating material 18 is also negligible. For a rod of .6 centimeter length, .16 cm. diameter, conventional insulating material of 1.2 centimeters in radial thickness, a temperature at the outside of the insulating material of 20° C. and an average rod temperature of 100° C., the total power lost through the insulation over the entire rod is about $6.5 \times 10^{-4}$ watts which is insignificant compared with the power flowing from the rod.

The effect of variation of emissivity of the face of the detector 2 as a function wavelength of the impinging beam is minimized by blackening the face and by use of the grooves 6. The grooves 6 play a particularly important role in maximizing absorption of the impinging radiant energy. Where the angle formed by the grooves is less than about 26°, any photons striking the detector 2 have little chance of being reflected away from the detector. If photons are not absorbed on initial contact, the angle of the grooves causes them to be reflected deeper into the groove and at each reflection about 90% of the reflected photons are absorbed. For example, an angle of about 26° assures at least two reflections before the photon reaches the apex of the groove angle.

Heat loss by radiation from the front face of the detector 2, although not entirely negligible, is quite small. Such heat losses are readily computable from the black body radiation law $$W = 4.18 A e \delta (T_1^4 - T_2^4)$$

where 4.18 = mechanical equivalent of heat
$e$ = emissivity of surface $(0 < e < 1)$
$\delta$ = Stephan-Boltsmann constant $$\delta = 5.672 \times 10^{-12} \frac{\text{joules}}{\text{cm.}^2 \text{ ° C.}^4}$$

$A$ = area of radiating surface
$T_1$ = temperature of surface
$T_2$ = ambient temperature For a detector with $e$ approximately equal to 1, area of the radiating surface equal to 0.196 cm.$^2$, temperature of the surface about 400° K., and ambient temperature of about 300° K., W is approximately equal to .3 watt. Since the heat loss varies as the fourth power of the temperature, a decrease in the value of $T_1$ significantly lowers the heat loss by radiation. For example, in a detector of the same area as that just mentioned, and values of $T_1$ and $T_2$ of 310° K. and 300° K. respectively, W is approximately equal to 0.02 watt. It will be apparent that by using a suitably low detector face temperature one can keep non-linearities due to radiation at a relatively low level in most cases. Actually, the heat losses are less than those just indicated since the detector was assumed to be a black body; i.e. having an emissivity of 1.0. Since it is not truly a black body, the power radiated is less than that for a black body. For cupric oxide at 200° C., $e = 0.6$, hence the radiation losses are only 60% of those in the above examples. Another factor of interest is that the emissivity of cupric oxide is constant over the temperature range of the instrument.

If copper-constantan thermocouples are used, the copper rod itself may be used as one element of the thermocouple and the constantan welded directly to it. If the dimensions of the rod, however, are too small, welding becomes difficult and it is perhaps better to use separate thermocouple elements and secure them to the rod with an adhesive, such as one of the epoxys. While aging of the thermocouple can be a problem in some applications, the effect here is neglible if both thermocouples are made from the same material at the same time. Since they are connected in a null type arrangement, such effects will have the same sign and similar magnitude, thereby tending to cancel each other out.

In essence, the radiation power indicator herein described possesses a number of highly desirable feature. It is accurate, its time constant is short, it is operable to measure high input power and is relatively insensitive as to wavelength. Finally, errors introduced by the size and shape of the detector, location of the thermocouples and changes of dimensions with temperature are small and ultimately can be absorbed in the constant $m$ in Equation 2. Other non-linear errors are small and can be neglected.

It will thus be seen that the objects set forth above among those made apparent from the preceding description, are efficiently attained and since certain changes may be made in the above article without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the present invention what is claimed as new and desired to secure by Letters Patent is:

1. A radiation power indicator for directly measuring the power in high energy radiation comprising:
   (A) means (2) for directly absorbing impinging radiant energy;
   (B) a heat dissipation means (10);
   (C) a temperature reference means (10);
   (D) a means (8) for conducting heat from the energy absorbing means to the heat dissipation means;
   (E) a means for measuring a temperature drop between a plurality of points along said conducting means.

2. A radiation power indicator comprising:
   (A) means (2) for absorbing impinging radiant energy;
   (B) a heat dissipation means (10);
   (C) a thermal conductor (8) extending between and in contact with said radiant energy absorbing means and said dissipation means whereby impinging radiant energy creates a temperature drop along said thermal conductor; and (D) means (14, 16) for measuring said temperature drop to provide an indicating of the power of said impinging radiant energy.

3. The radiation power indicator of claim 2 wherein said means for absorbing impinging radiant energy has a blackened surface (4) to improve energy absorption.

4. The radiation power indicator of claim 3 wherein said means for absorbing radiant energy means has a grooved surface with the groove sidewalls intersecting at an angle such that impinging photons are reflected deeper into said grooves thereby minimizing the effect of reflection.

5. The radiation power indicator of claim 4 wherein said grooves are concentric.

6. A radiation power indicator of claim 5 wherein said energy absorbing means and said heat conducting means are sized with respect to each other such that there is a preselected temperature drop along said conducting means for each watt of heat flow in said conducting means.

7. The radiation power indicator of claim 6 wherein said energy absorbing means and said thermal conductor are sized such that the temperature drop along said thermal conductor is approximately 2.5° C. for each watt of heat flow in said conducting means.

8. The radiation power indicator of claim 6 wherein said means for measuring said temperature drop includes at least two thermocouples (14, 16) so connected that their output voltages are in opposition, thereby providing a total output indicative of their temperature difference.

9. The radiation power indicator of claim 5 wherein said grooves in said sidewalls form an angle less than 30 degrees.

10. The radiation power indicator of claim 6 including a readout device (20) arranged to respond to said output by providing a direct indication of the radiation power impinging on said energy absorbing means.

11. The radiation power indicator of claim 2 wherein the reciprocal of the time constant of said indicator is greater than the rate of temperature change of said heat sink.

12. A radiation power indicator comprising:
(A) a detector (2) for absorbing substantially all radiant energy impinging thereon;
(B) a heat sink (10) maintained at a substantially constant temperature;
(C) a highly thermally conductive rod (8) connecting said detector and heat sink (10) so as to conduct to said sink substantially all of the heat resulting from impinging radiant energy, said rod having
 (1) a short length and
 (2) a small cross-sectional area relative to that of said detector so as to minimize the time constant of said radiation power indicator without unduly decreasing the resolution;
(D) thermocouple means (14, 16) for measuring the temperature drop along said rod corresponding to the heat conduction along it; and
(E) readout means (20) connected to said thermocouple to provide a visual indication of the thermocouple output voltage.

13. A device for directly measuring the power of an incident laser beam comprising:
(A) a detector (2) for absorbing the energy in said beam;
(B) a thermal conductor (8) having one end in contact with said detector;
(C) a heat sink (10) in contact with the other end of said thermal conductor, said heat sink being capable of dissipating large quantities of heat thereby limiting the temperature of said thermal conductor resulting from the heat generated in said detector by said laser beam; and (D) means for measuring the temperature drop along said conductor to provide an indication of the power of said laser beam;
 (1) said detector and said thermal conductor being made of a material having a low ratio of the product of its density and specific heat divided by its thermal conductivity $\rho c/k$.

14. The device of claim 13 wherein said detector and thermal conductor are made of a metal selected from the group consisting of silver, gold, aluminum and copper.

15. The device of claim 14 wherein said detector and thermal conductor are made of silver.

16. The device of claim 14 wherein said detector and thermal conductor are made of copper.

17. The device of claim 16 wherein the face of said detector, upon which said laser beam impinges, has black cupric oxide formed thereon to improve energy absorption.

18. The device of claim 13 wherein said thermal conductor and detector, except for the detector face upon which said laser beam impinges, are surrounded by an insulating material to minimize heat losses to the external environment and thereby substantially confine flow of heat to said heat sink.

19. A device for directly measuring the power of an incident laser beam comprising:
(A) a copper detector for absorbing the energy in said beam, said detector having
 (1) a black, highly absorbant cupric oxide coated face with
 (2) grooves in said face, said grooves having sidewalls intersecting at an angle less than 30°;
(B) a copper thermal conductor of smaller cross-sectional area than said detector in contact with the side of said detector opposite said face,
 (1) said thermal conductor having
  (a) short length and
  (b) a small cross-sectional area relative to that of said detector so as to minimize the time constant of the device without unduly decreasing its resolution;
(C) insulating material surrounding said detector and thermal conductor, except for said detector face, to minimize radial heat losses;
(D) a heat sink (10) maintained at substantially a constant temperature in contact with said thermal conductor at its end opposite said detector to provide a temperature drop along said thermal conductor as heat is conducted away from said detector into said heat sink;
(E) a pair of thermocouples spaced apart along said thermal conductor,
 (1) said thermocouples being at opposite ends of said conductor,
 (2) said thermocouple outputs being connected so that their output voltages are in opposition, thereby providing an output indicative of their voltage difference; and
(F) a meter to which said thermocouple net output is applied,
 (1) said meter being calibrated to provide a direct indication of the power of the laser beam impinging on said detector.

References Cited
UNITED STATES PATENTS 3,313,154  4/1967  Bruce.
3,355,674  11/1967  Hardy _____ 331—94.5
3,391,279  7/1968  Detrio.

RALPH G. NILSON, Primary Examiner

M. J. FROME, Assistant Examiner

U.S. Cl. X.R.

73—190; 250—83; 331—94.5